United States Patent
Akaike et al.

(10) Patent No.: US 10,245,986 B2
(45) Date of Patent: Apr. 2, 2019

(54) VEHICLE SEAT (71) Applicant: TOYOTA BOSHOKU KABUSHIKI KAISHA, Aichi-ken (JP)

(72) Inventors: Fumitoshi Akaike, Aichi-ken (JP); Koji Kaneda, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/484,460

(22) Filed: Apr. 11, 2017

(65) Prior Publication Data
US 2017/0297460 A1 Oct. 19, 2017

(30) Foreign Application Priority Data
Apr. 15, 2016 (JP) .................. 2016-081938

(51) Int. Cl.
| | |
|---|---|
| B60N 2/42 | (2006.01) |
| B60N 2/68 | (2006.01) |
| B60N 2/427 | (2006.01) |
| B60N 2/90 | (2018.01) |
| B60N 2/64 | (2006.01) |
| B60N 2/02 | (2006.01) |
| B60N 2/22 | (2006.01) |
| B60N 2/885 | (2018.01) |

(52) U.S. Cl.
CPC ....... *B60N 2/42745* (2013.01); *B60N 2/0232* (2013.01); *B60N 2/0276* (2013.01); *B60N 2/22* (2013.01); *B60N 2/2222* (2013.01); *B60N 2/4235* (2013.01); *B60N 2/643* (2013.01); *B60N 2/68* (2013.01); *B60N 2/686* (2013.01); *B60N 2/885* (2018.02); *B60N 2/99* (2018.02)

(58) Field of Classification Search
CPC .... B60N 2/4228; B60N 2/68; B60N 2/42709; B60N 2/0232; B60N 2/22
See application file for complete search history.

(56) References Cited

U.S. PATENT DOCUMENTS

| | | | | | |
|---|---|---|---|---|---|
| 4,707,027 | A | * | 11/1987 | Horvath | ................ B60N 2/914 297/284.6 |
| 6,022,074 | A | * | 2/2000 | Swedenklef | ......... B60N 2/2222 297/216.14 |
| 6,062,642 | A | * | 5/2000 | Sinnhuber | ............ B60N 2/4228 297/216.1 |

(Continued)

FOREIGN PATENT DOCUMENTS

JP  5-76860  10/1993

*Primary Examiner* — Shin H Kim
(74) *Attorney, Agent, or Firm* — Greenblum & Bernstein, P.L.C.

(57) ABSTRACT

A vehicle seat including: a seat back including a top plate main part configured to support a body of a seated person from the rear side and a top plate side part configured to protrude more forward than the top plate main part to support the body of the seated person from the lateral side; a side adjuster configured to move the top plate side part between a protruding position in which the top plate side part protrudes more forward than the top plate main part and a retracted position in which the top plate side part is retracted from the protruding position; and a controller configured to, in a case where a side collision of a vehicle is detected, drive and control the side adjuster so that the top plate side part is in the protruding position.

7 Claims, 12 Drawing Sheets

(56) References Cited

U.S. PATENT DOCUMENTS

| | | | | |
|---|---|---|---|---|
| 6,076,887 A * | 6/2000 | Andersson | B60N 2/4235 | 297/216.1 |
| 6,170,786 B1 * | 1/2001 | Park | B60N 2/0232 | 248/274.1 |
| 6,568,753 B1 * | 5/2003 | Watanabe | B60N 2/42781 | 297/216.12 |
| 6,719,368 B1 * | 4/2004 | Neale | B60N 2/42727 | 297/216.14 |
| 9,321,379 B2 * | 4/2016 | Yamaguchi | B60N 2/682 | |
| 9,415,713 B2 * | 8/2016 | Line | B60N 2/643 | |
| 9,809,131 B2 * | 11/2017 | Line | B60N 2/0232 | |
| 9,914,378 B1 * | 3/2018 | Line | B60N 2/5825 | |
| 2010/0066116 A1 * | 3/2010 | Coenen | B60N 2/4214 | 296/65.01 |
| 2010/0253122 A1 * | 10/2010 | Okimoto | A47C 1/023 | 297/330 |
| 2011/0057492 A1 * | 3/2011 | Nakamura | B60N 2/4228 | 297/301.4 |
| 2011/0221247 A1 * | 9/2011 | Hashimoto | B60N 2/0232 | 297/216.13 |
| 2011/0241403 A1 * | 10/2011 | Yamaguchi | B60N 2/4228 | 297/452.31 |
| 2014/0203603 A1 * | 7/2014 | Line | B60N 2/64 | 297/218.1 |
| 2014/0252837 A1 * | 9/2014 | Yamaguchi | B60N 2/682 | 297/452.18 |
| 2015/0091282 A1 * | 4/2015 | Nagasawa | B60N 2/4228 | 280/730.1 |
| 2015/0165937 A1 * | 6/2015 | Harda | B60N 2/4221 | 701/45 |
| 2015/0352986 A1 * | 12/2015 | Fujita | B60N 2/68 | 297/216.1 |
| 2015/0367762 A1 * | 12/2015 | Yasuda | B60N 2/42745 | 297/216.14 |
| 2016/0001677 A1 * | 1/2016 | Stewart | B60N 2/22 | 297/361.1 |
| 2016/0001689 A1 * | 1/2016 | Yasuda | B60N 2/80 | 297/391 |
| 2016/0009207 A1 * | 1/2016 | Kuroda | B60N 2/80 | 297/180.14 |
| 2016/0121761 A1 * | 5/2016 | Nishide | B60N 2/2222 | 297/284.3 |
| 2016/0304046 A1 * | 10/2016 | McCoy | B60N 2/4228 | |
| 2017/0080833 A1 * | 3/2017 | Dry | B60N 2/914 | |
| 2017/0096084 A1 * | 4/2017 | Akaike | B64D 11/0639 | |
| 2017/0174153 A1 * | 6/2017 | Line | B60N 2/4228 | |
| 2017/0217341 A1 * | 8/2017 | Kaneda | B60N 2/99 | |
| 2017/0267133 A1 * | 9/2017 | Shimizu | B60N 2/66 | |
| 2017/0291511 A1 * | 10/2017 | Akaike | B60N 2/427 | |
| 2017/0297460 A1 * | 10/2017 | Akaike | B60N 2/4492 | |

* cited by examiner

VEHICLE SEAT

CROSS-REFERENCE TO RELATED APPLICATIONS

This application claims priority from Japanese Patent Application No. 2016-081938 filed on Apr. 15, 2016, the entire contents of which are incorporated herein by reference.

TECHNICAL FIELD

The disclosure relates to a vehicle seat. Specifically, the disclosure relates to a vehicle seat in which a seat back includes a top plate main part configured to support a body of a seated person from the rear side and a top plate side part configured to protrude more forward than the top plate main part to support the body of the seated person from the lateral side.

BACKGROUND

There is known a vehicle seat having a structure in which a seat back includes a top plate main part for supporting a body of a seated person from the rear side and a top plate side part protruding in a shape expanding forward from both left and right sides of the top plate main part to support the body of the seated person from both outer sides JP-U-H05-076860). The seat back has a configuration in which the left and right top plate side parts form a continuous shell-like shape independent from the top plate main part and can be moved rearward with respect to the top plate main part when getting on and off the vehicle.

In the above technology, when the top plate side parts are retracted at the time of being used for seating, the support for the body of the seated person from the lateral side is lost. Therefore, it is difficult to appropriately protect the body of the seated person at the time of occurrence of a side collision of the vehicle. The disclosure has been made as a solution to the above problem and an object to be achieved by the disclosure is to make it possible to appropriately protect the body of the seated person from the lateral side at the time of occurrence of a side collision of a vehicle, even when the top plate side parts can be retracted at the time of being used for seating.

SUMMARY

In order to achieve the above object, aspects of the disclosure provide a vehicle seat described hereinafter.

According to an aspect of the disclosure, there is provided a vehicle seat including: a seat back including: a top plate main part configured to support a body of a seated person from the rear side; and a top plate side part configured to protrude more forward than the top plate main part to support the body of the seated person from the lateral side; a side adjuster configured to move the top plate side part between a protruding position in which the top plate side part protrudes more forward than the top plate main part and a retracted position in which the top plate side part is retracted from the protruding position; and a controller configured to, in a case where a side collision of a vehicle is detected, drive and control the side adjuster so that the top plate side part is in the protruding position.

Accordingly, even when the top plate side part configured to support the body of the seated person from the lateral side can be retracted from the protruding position by the side adjuster, in a case where a side collision of the vehicle is detected, the top plate side part is in the protruding position by the controller. Therefore, it is possible to appropriately protect the body of the seated person from the lateral side by the top plate side part.

DETAILED DESCRIPTION

Hereinafter, an embodiment for carrying out the disclosure will be described with reference to the drawings.

First Embodiment

Figure 1:
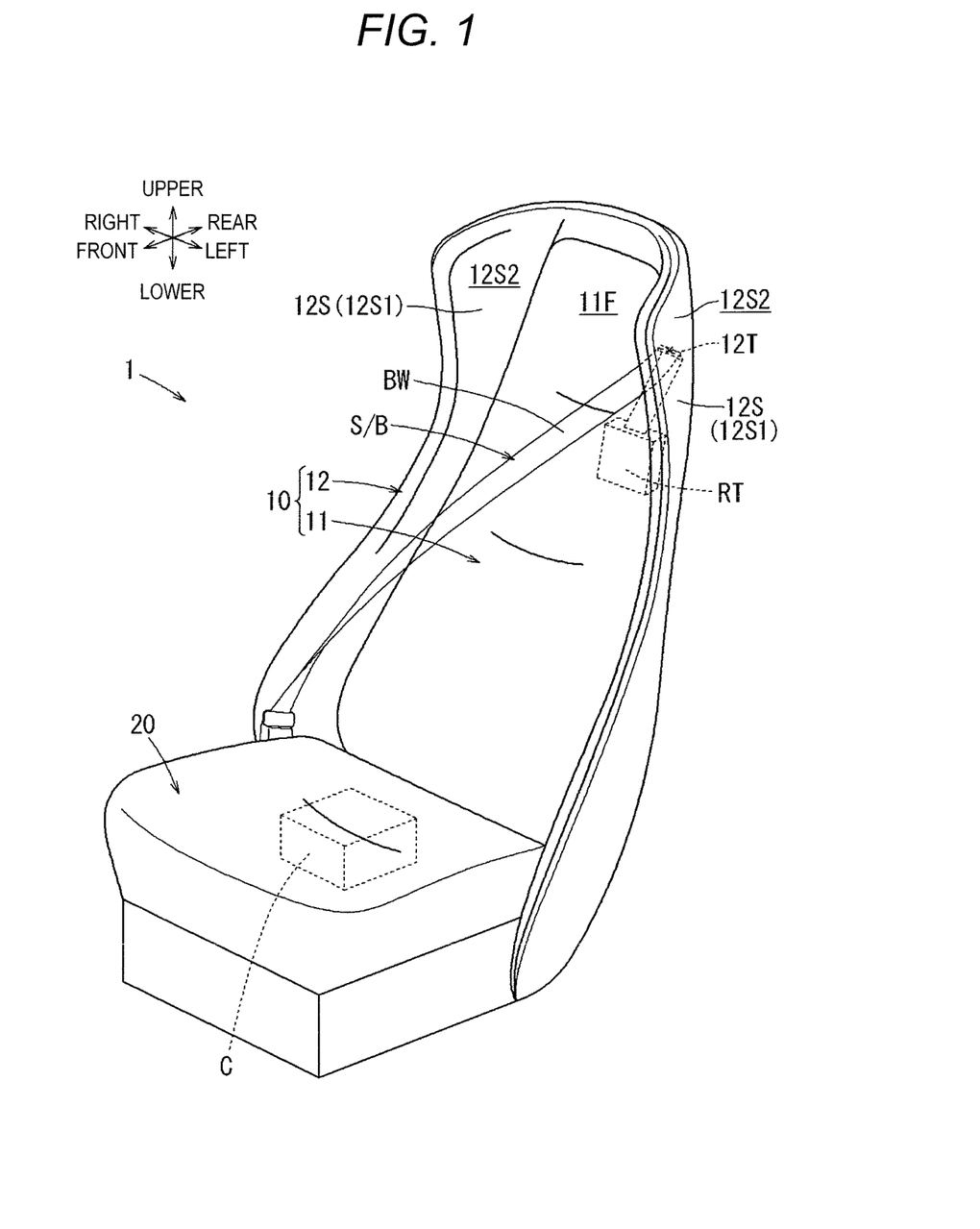
FIG. 1 is a perspective view showing a schematic configuration of a vehicle seat according to a first embodiment.

First, a configuration of a seat 1 (vehicle seat) according to a first embodiment will be described with reference to FIGS. 1 to 14. As shown in FIG. 1, the seat 1 of the present embodiment is configured as a left seat of an automobile and includes a seat back 10 serving as a backrest of a seated person and a seat cushion 20 serving as a seating part. The above-described seat back 10 is divided into a main back part 11 for supporting a body of a seated person from the rear side and a shell back part 12 located behind the main back part 11 and protruding in a shape curved forward at both outer sides so as to support the body of the seated person from both outer sides (both lateral sides). The above-described main back part 11 has a so-called high-back type structure which integrally includes a headrest part 11F serving as a headrest of the seated person at an upper portion thereof. Here, the above-described main back part 11 corresponds to the "top plate main part" of the disclosure, and the above-described shell back part 12 corresponds to the "top plate side part" of the disclosure.

Figure 2:
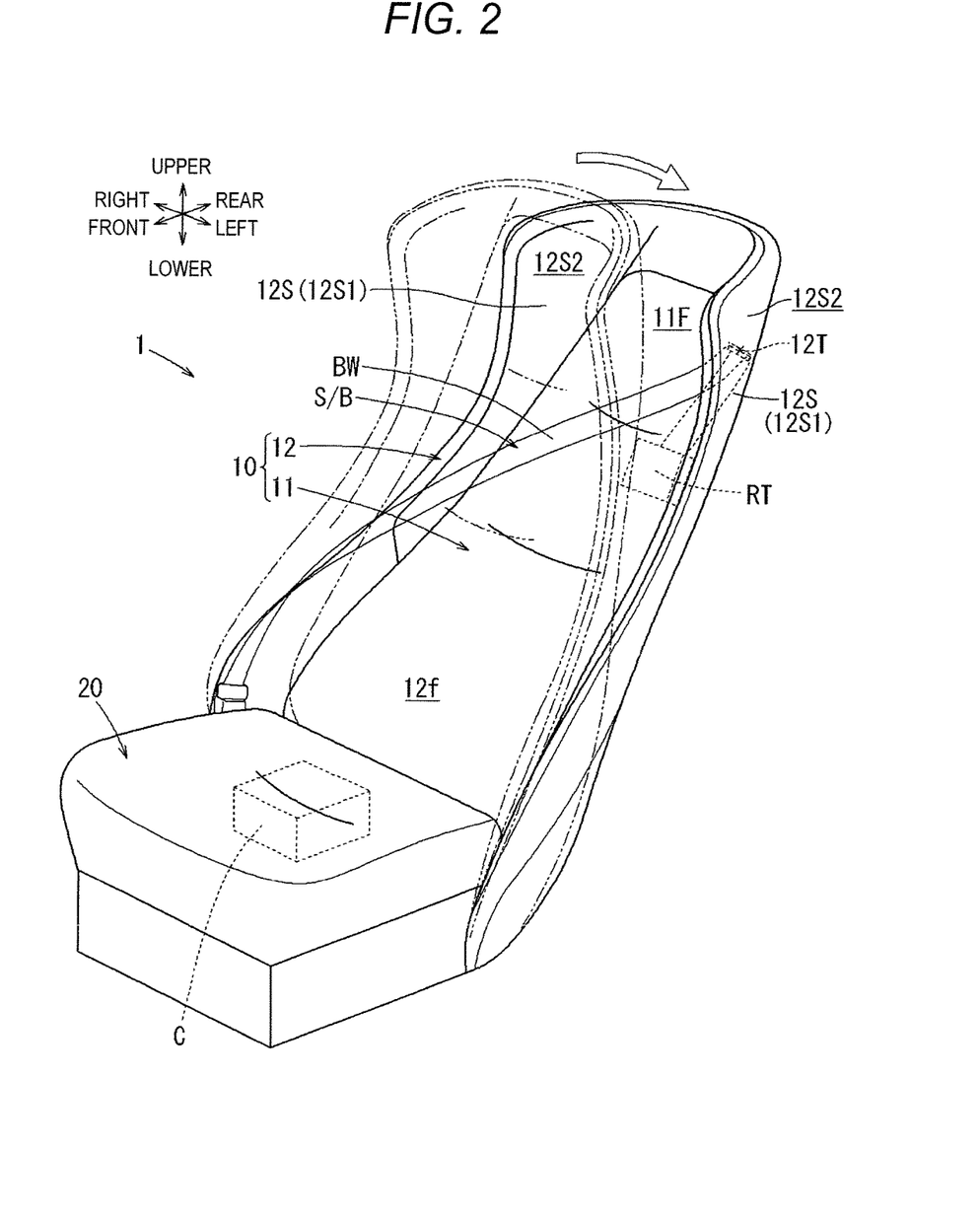
FIG. 2 is a perspective view showing a state in which a seat back is tilted rearward in a relaxed posture.
Figure 3:
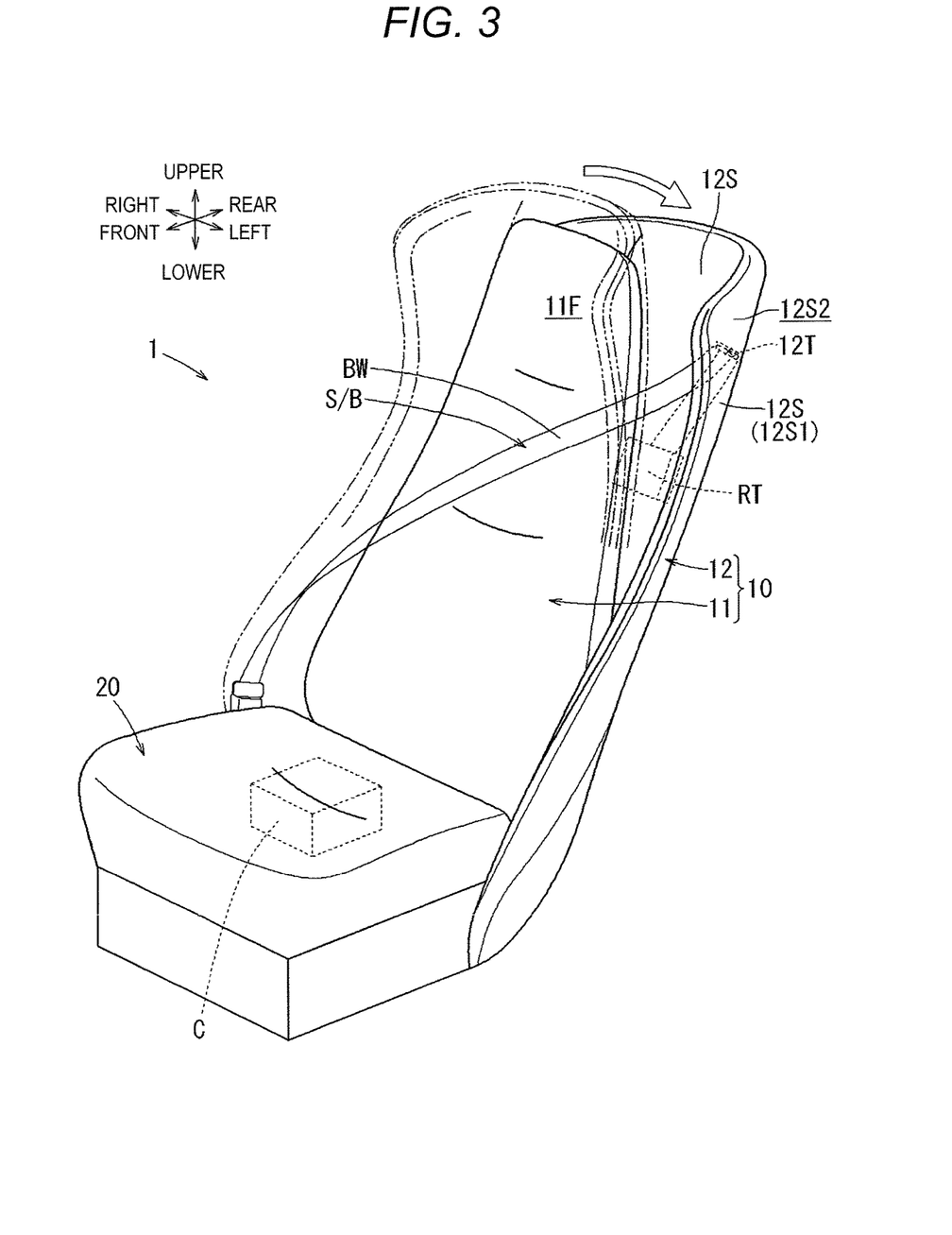
FIG. 3 is a perspective view showing a state in which a shell back part of the seat back is drawn away rearward from a main back part.

Each of the main back part 11 and the shell back part 12 described above are supported so that the reclining thereof can be individually adjusted. With this configuration, as shown in FIGS. 1 and 2, the main back part 11 and the shell back part 12 can be tilted together in a front and rear direction in a state where they are superimposed on each other in the front and rear direction. On the other hand, as shown in FIG. 3, each of the main back part 11 and the shell back part 12 can be individually moved in the front and rear direction in a separated manner, so that the shell back part 12 can be, for example, retracted from the main back part 11.

As shown in FIGS. 1 and 2, the above-described shell back part 12 has a shape including side support portions 12S that supports the body of the seated person from both left and right outer sides by protruding forward from both left and right sides of the main back part 11 when the shell back part 12 is superimposed on the rear side of the main back part 11. Each of the side support portions 12S described above includes a head side support portion 12S2, which is provided at an upper portion of each side support portion 12S located at both left and right sides of the headrest 11F of the above-described main back part 11. Each head side support portion 12S2 is configured to cover the head of the seated person in a surrounding manner from both left and right sides. In each of the side support portions 12S for supporting the body of the seated person from both left and right outer sides, each of the head side support portions 12S2 is a portion which protrudes most toward the front side. With the configuration of each of the head side support portions 12S2, the body of the seated person, particularly, the head thereof is enclosed widely from both left and right sides.

Figure 14:
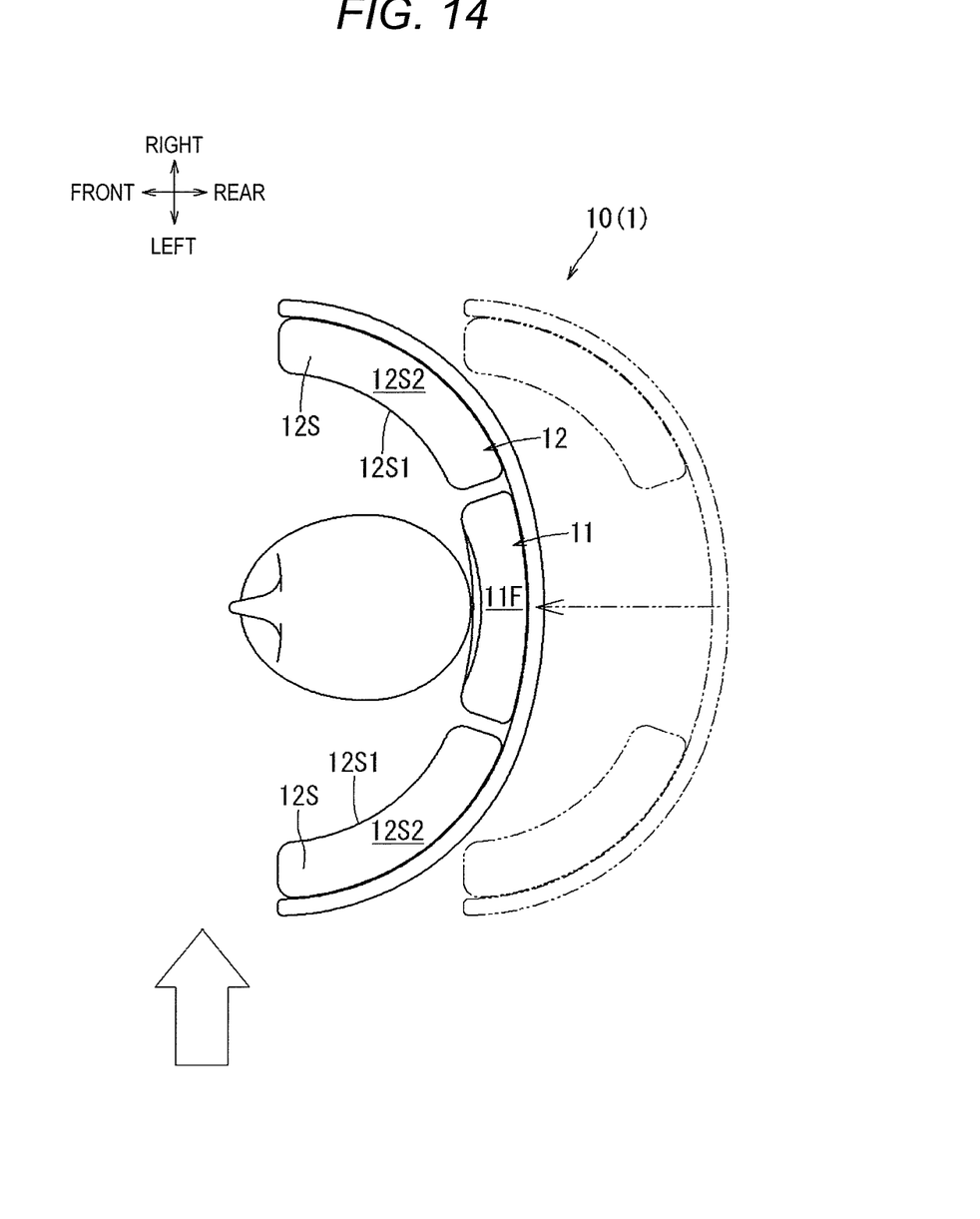
FIG. 14 is a plan view showing a state in which the top plate side part is moved from a retracted position to a protruding position.

As shown in FIG. 14, each of the above-described side support portions 12S has an inner surface that comes into contact with the body of the seated person from the lateral side. The inner surface is formed as a curved concave surface 12S1 that protrudes in a shape of being curved forward in a round form and in a concave shape along the body of the seated person. With this configuration, the curved concave surfaces 12S1 of the respective side support portions 12S can come into contact with the body of the seated person so as to widely wrap the body of the seated person from the lateral side, thereby appropriately protecting the body of the seated person from the lateral side. As shown in FIG. 3, the above-described shell back part 12 is in an inclination angle in which it is retracted with respect to the main back part 11, so that the above-described respective side support portions 12S on the left and right sides are suppressed or prevented from protruding toward the front side with respect to the main back part 11.

As the shell back part 12 is retracted with respect to the main back part 11 as described above, the seated person can take a relaxed posture in which his arms can be pulled rearward. Particularly, as the shell back part 12 is pulled rearward from the relaxed posture in which the main back part 11 is tilted rearward, there is no feeling of cramping such as the feeling that the seated person's arms are pressed against the respective side support portions 12S and thus the width of the backrest is narrowed. Therefore, the seated person can feel freedom and take a relaxed posture, in which his arms can be spread to both outer sides or can be pulled rearward.

Figure 4:
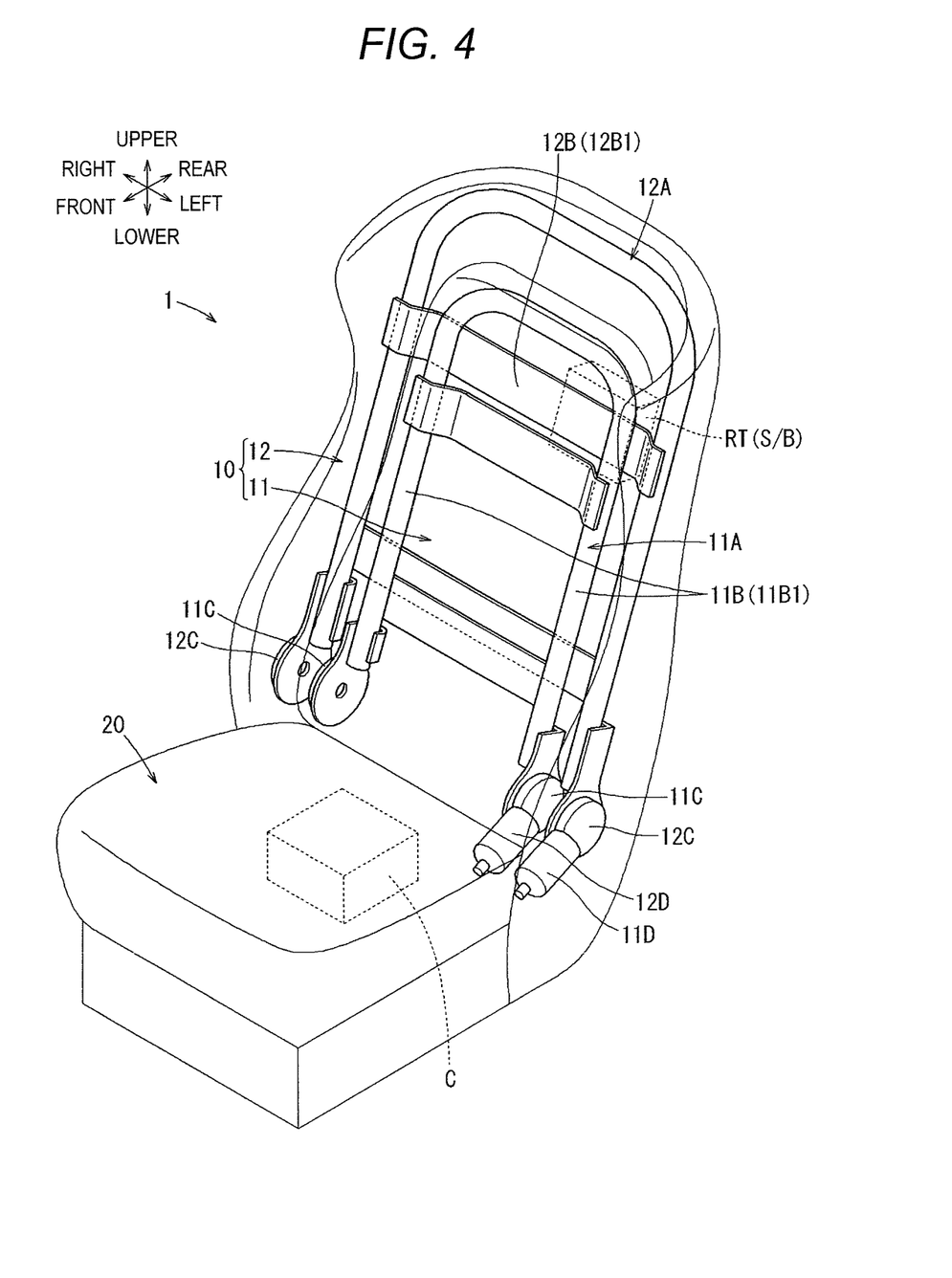
FIG. 4 is a perspective view showing a frame structure of the seat back.

As shown in FIG. 4, an internal framework of the above-described main back part 11 is configured by a main frame part 11A that is assembled in a substantially inverted U shape. The main frame part 11A is configured as a frame member forming a main framework along an outer peripheral portion such as both side portions and an upper portion of the main back part 11. Further, the main frame part 11A is configured such that the lower end portions on both left and right sides thereof are connected to the rear end portions on both left and right sides of the seat cushion 20 through an electric-type main back recliner 11C, respectively.

With the above configuration, the rotation of the main frame part 11A is prevented by the main back recliners 11C in a normal state where the driving of each main back recliner 11C is stopped. Thus, the main frame part 11A is held as a state where an angular posture thereof with respect to the seat cushion 20 is fixed at a fixed position. Further, as each main back recliner 11C described above is driven in each of the forward and reverse directions, the angular posture of the main frame part 11A with respect to the seat cushion 20 is changed to each of the front and rear directions corresponding to the operating direction. Each main back recliner 11C described above is configured so that it is driven by receiving a driving force transmitted from a main back motor 11D connected to the main back recliners 11C or the driving thereof is stopped by a braking force due to the driving stop of the main back motor 11D.

Further, an internal framework of the shell back part 12 is configured by a shell frame part 12A that is assembled in a substantially inverted U shape. The shell frame part 12A is configured as a frame member forming a main framework along an outer peripheral portion such as both side portions and an upper portion of the shell back part 12. Further, the shell frame part 12A is configured such that the lower end portions on both left and right sides thereof are connected to the rear end portions on both left and right sides of the seat cushion 20 through an electric-type shell back recliner 12C, respectively.

With the above configuration, the rotation of the shell frame part 12A is prevented by these shell back recliners 12C in a normal state where the driving of each shell back recliner 12C described above is stopped. Thus, the shell frame part 12A is held as a state where an angular posture thereof with respect to the seat cushion 20 is fixed at a fixed position. Further, as each shell back recliner 12C described above is driven in each of the forward and reverse directions, the angular posture of the shell frame part 12A with respect to the seat cushion 20 is changed to each of the front and rear directions corresponding to the driving direction. Each shell back recliner 12C described above is configured so that it is driven by receiving a driving force transmitted from a shell back motor 12D connected to the shell back recliners 12C or the driving thereof is stopped by a braking force due to the driving stop of the shell back motor 12D.

A plate-like bridging plate 12B is provided so as to be integrally bridged between both frame sides of the U-shaped portion of the above-described shell frame part 12A. The bridging plate 12B is provided so as to laterally extend across a region on the rear side in the vicinity of the upper end side of both side frames 11B of the U-shaped portion of the main frame part 11A. With the above configuration, as the shell frame part 12A moves to approach the main frame part 11A from the rear side, the above-described bridging plate 12B comes into contact with the both side frames 11B of the main frame part 11A from the rear side, and thus, the movement thereof is locked.

Figure 13:
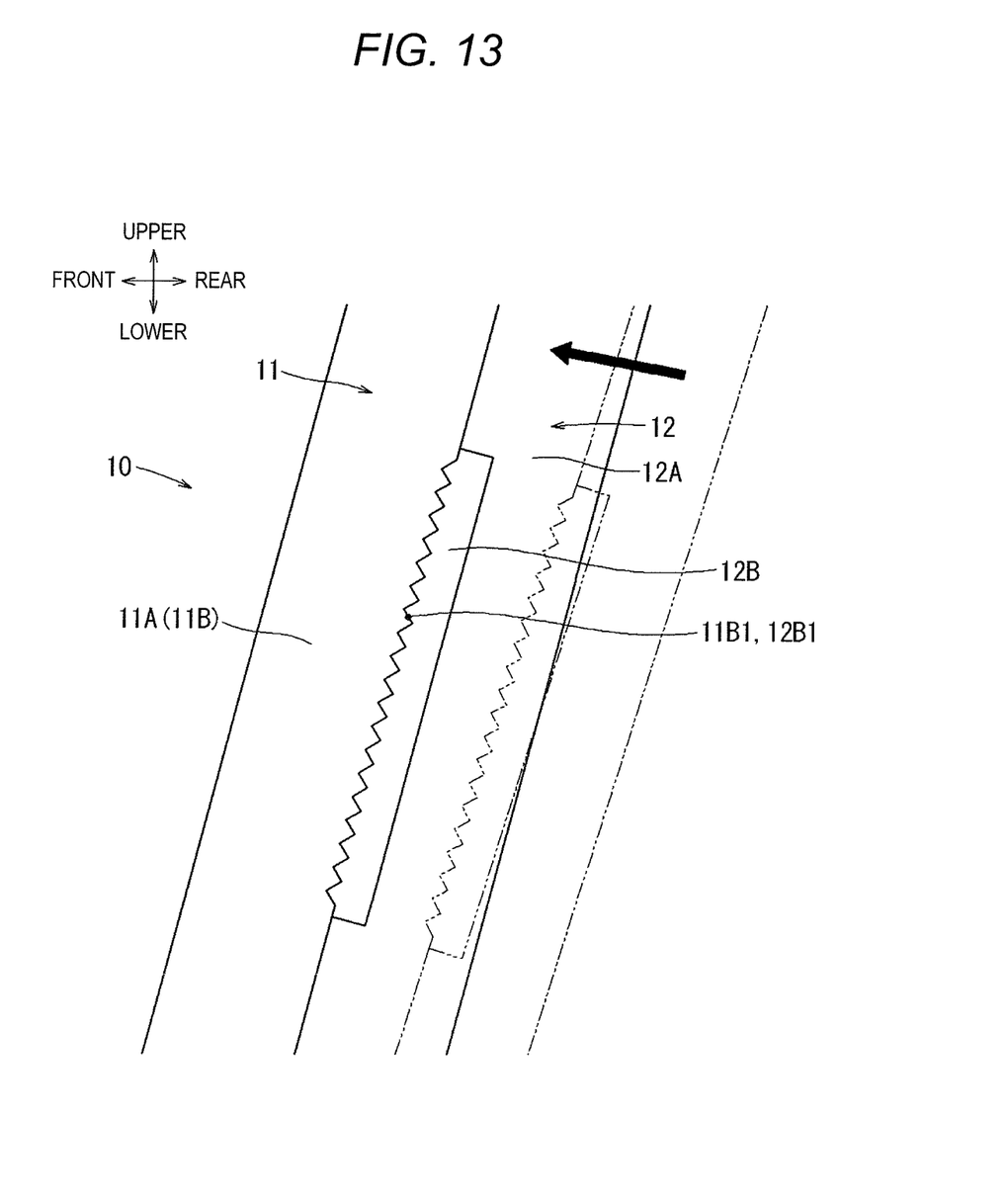
FIG. 13 is an enlarged view showing a meshing structure provided between contact portions of the main back part and the shell back part.

As shown in FIG. 13, meshing teeth 12B1, 11B1 are formed at each of contact portions between the above-described bridging plate 12B and each side frame 11B to be pressed against each other. The meshing teeth 12B1, 11B1 are meshed with each other by being pressed against each other in the front and rear direction. Each of these meshing teeth 12B1, 11B1 has a shape in which a plurality of teeth is arranged in a height direction. The meshing teeth 12B1, 11B1 are meshed with each other, thereby restricting the relative movement between the bridging plate 12B and each side frame 11B in the height direction. With the above configuration, in the state where the shell frame part 12A and the main frame part 11A are pressed against and meshed with each other in the front and rear direction, they call take an integral state in which slippage in the height direction therebetween does not occur.

As shown in FIG. 4, a retractor RT of a seat belt device S/B to be attached to a seated person of the seat 1 is also attached to the bridging plate 12B. As shown in FIG. 1, the seat belt device S/B is attached to the body of the seated person in such a way that a belt webbing BW released from the above-described retractor RT passes through the inside of the shell back part 12 and is pulled out to the front region of the main back part 11 from a belt passage hole 12T formed at a left shoulder of the shell back part 12.

With the above configuration, when the front collision of the vehicle occurs, the body of the seated person is pressed against the belt webbing BW, and thus, the shell back part 12 receives an excessive external load. Thereby, the shell back part 12 is subjected to a force for strongly pushing and bending its upper region to which the retractor RT is attached toward the front side with, as a fulcrum, a fixed portion set by each shell back recliner 12C on the lower end side; like bending in a cantilever support beam. Further, when the rear collision of the vehicle occurs, the main back part 11 receives an excessive external load due to the pushing of the body of the seated person from the front side. Thereby, the main back part 11 is subjected to a force for strongly pushing and bending it toward the rear side with, as a fulcrum, a fixed portion set by each main back recliner 11C on the lower end side, like bending in a cantilever support beam. Here, each main back recliner 11C and each shell back recliner 12C described above are respectively arranged coaxially with each other and around an axis in a seat width direction so as to be able to adjust the reclining of the main back part 11 and the shell back part 12 in the front and rear direction.

In this way, the seat back 10 is configured to receive a force such that the shell back part 12 at the rear side is strongly pressed and bent toward the main back part 11 at the front side or the main back part 11 at the front side is strongly pressed and bent toward the shell back part 12 at the rear side due to the occurrence of the front or rear collision of the vehicle. However, even when an excessive external load in the front and rear direction is inputted to the main back part 11 or the shell back part 12 described above, the seat back 10 is configured such that the main back part 11 or the shell back part 12, which receives the load, is pressed against the other of the main back part 11 or the shell back part 12 to be supported from the backside by the movement control of a controller C to be described later. In this way, it is possible to appropriately receive the load in two stages.

Further, when the side collision of the vehicle occurs, the above-described seat back 10 is configured to appropriately cover and protect the body of the seated person from the lateral side by each corresponding side support portion 12S of the shell back part 12, which protrude forward from both left and right sides of the main back part 11 described above. However, as described with reference to FIG. 3, when the shell back part 12 is in the state retracted from the main back part 11, the seat back 10 is in the state where the forward protrusion of the side support portions 12S on each side is suppressed. Therefore, in the above state, it is difficult to appropriately support the body of the seated person from the lateral side by the side support portions 12S on each side.

Therefore, when the shell back part 12 is retracted from the main back part 11 at the time of occurrence of the side collision of the vehicle, the shell back part 12 is moved to a position where it comes into contact with the main back part 11 from the backside by the movement control of the controller C (to be described later), and thus, the seat back 10 is switched to a state (see FIG. 14) in which the side support portions 12S on each side are largely protruded from both left and right sides of the main back part 11 toward the front side. With this switching, the seat back 10 is configured to be able to appropriately support an excessive external load from the lateral side received from the body of the seated person by each corresponding side support portion 12S of the shell back part 12 described above.

Figure 9:
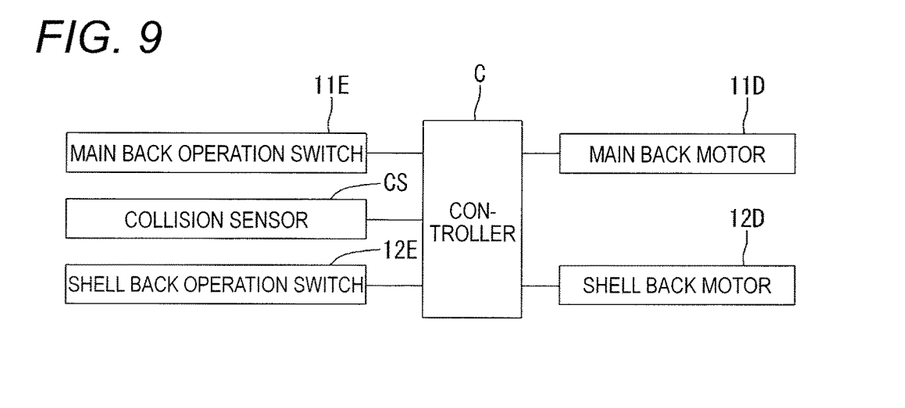
FIG. 9 is a block diagram of a system for adjusting an inclination angle of the seat back.

Specifically, as shown in FIG. 9, the above-described controller C is connected to a main back operation switch 11E for performing an ON/OFF switching operation of the driving of the main back motor 11D and a shell back operation switch 12E for performing an ON/OFF switching operation of the driving of the shell back motor 12D. The controller C drives and controls the main back motor 11D and the shell back motor 12D based on the operations instructions from these operation switches. At that time, the controller C can detect the rotational positions of the main back motor 11D and the shell back motor 12D based on the number of pulse signals. In this way, the controller C can detect inclination angles of the main back part 11 and the shell back part 12 whose angles are adjusted by the driving operation of each main back recliner 11C and each shell back recliner 12C. Although a specific illustration is omitted, the main back operation switch 11E and the shell back operation switch 12E described above are provided at predetermined portions of the seat 1, such as a side portion of the seat cushion 20 described with reference to FIG. 1.

Figure 5:
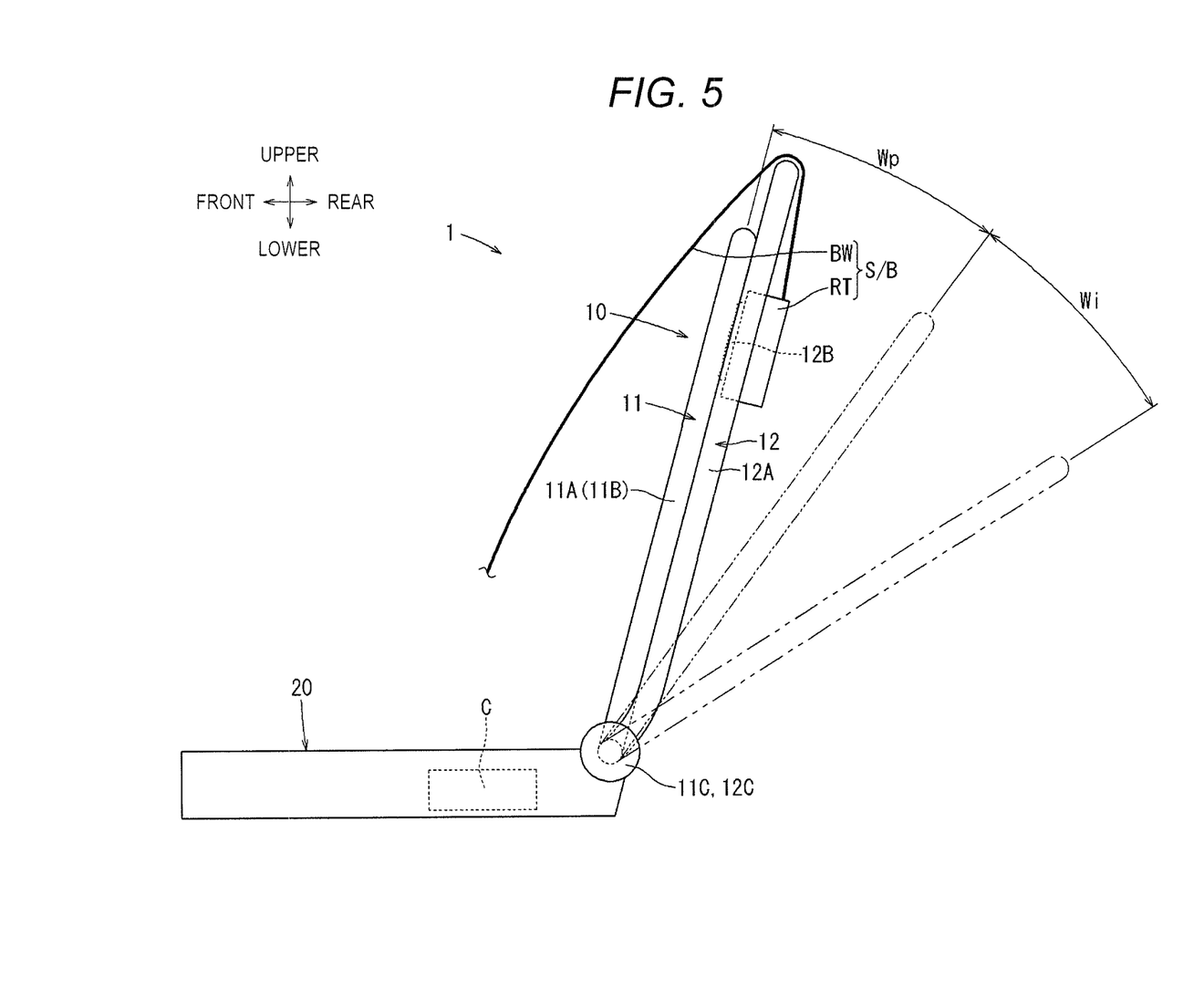
FIG. 5 is a side view showing an appropriate range and an inappropriate range of the load receiving of the seat back.

Further, as shown in FIG. 9, the above-described controller C is also connected to a collision sensor CS that is mounted on a vehicle. The collision sensor CS detects in advance the occurrence of the front, rear or side collision of the vehicle. The controller receives an input signal from the collision sensor CS. Based on the input signal from the collision sensor CS, the controller C determines a timing when an excessive external load due to the occurrence of the collision will be inputted to the main back part 11 or the shell back part 12, and drives and controls the main back motor 11D or the shell back motor 12D. Specifically, as shown in FIG. 5, in a case where it is determined that an excessive external load due to the occurrence of the collision is inputted to the main back part 11 or the shell back part 12, the above-described controller C first performs an angle correction so as to move the main back part 11 into the appropriate range Wp suitable for receiving the load when the main back part 11 is in the inappropriate range Wi out of the appropriate range Wp.

Here, the above-described appropriate range Wp is set as an angle range in which the body of the seated person rests in a normal seated posture, i.e., an angle range which is almost upright but is tilted rearward. Further, the inappropriate range Wi is set as a range out of the appropriate range Wp. Here, the above-described appropriate range corresponds to the "predetermined angle range suitable for receiving the load" of the disclosure.

Figure 6:
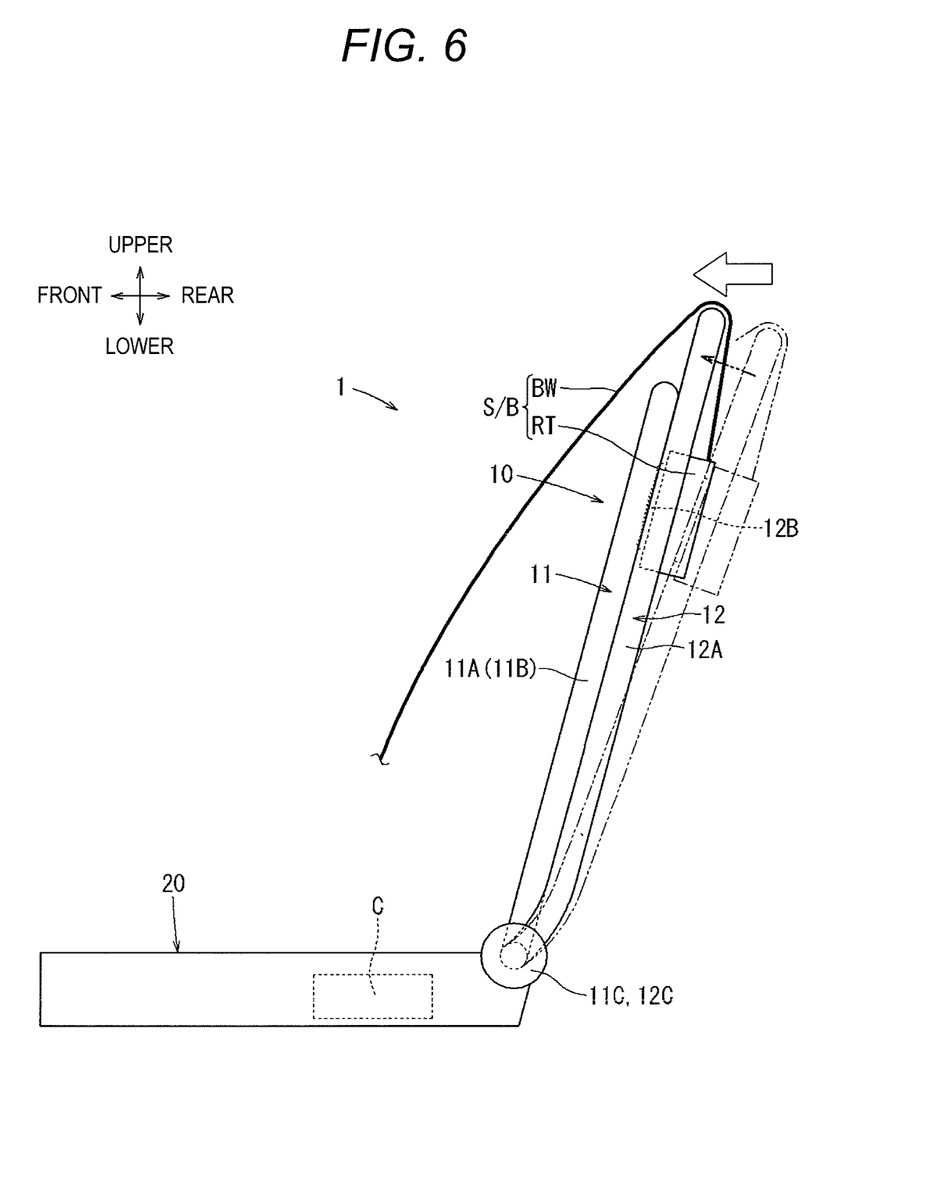
FIG. 6 is a side view showing a state in which an angle of the seat back is adjusted in accordance with the detection of a front collision of a vehicle.
Figure 10:
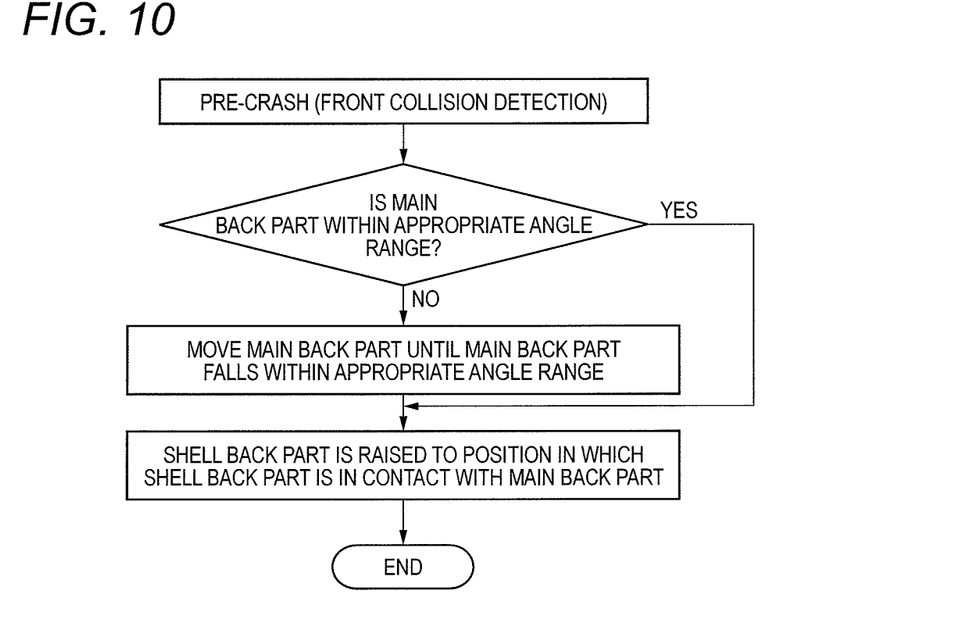
FIG. 10 is a flowchart showing a flow in which the angle of the seat back is adjusted in accordance with the detection of the front collision of the vehicle.

Further, after performing the angle correction, in a case where the collision detection is detection of the front collision of the vehicle, as shown in FIG. 6, the controller C drives and controls the shell back part 12, which receives the forward load due to the occurrence of the front collision, such that the shell back part 12 is adjusted to a rear load receiving inclination angle, in which the shell back part 12 comes into contact with the main back part 11 at the front side from the rear side (see FIG. 10). Since this drive control has been performed, an excessive external load applied to the shell back part 12 so as to push and bend the shell back part 12 toward the front side is also received by the main back part 11. In this way, it is possible to appropriately receive the external load in two stages by both parts.

Figure 7:
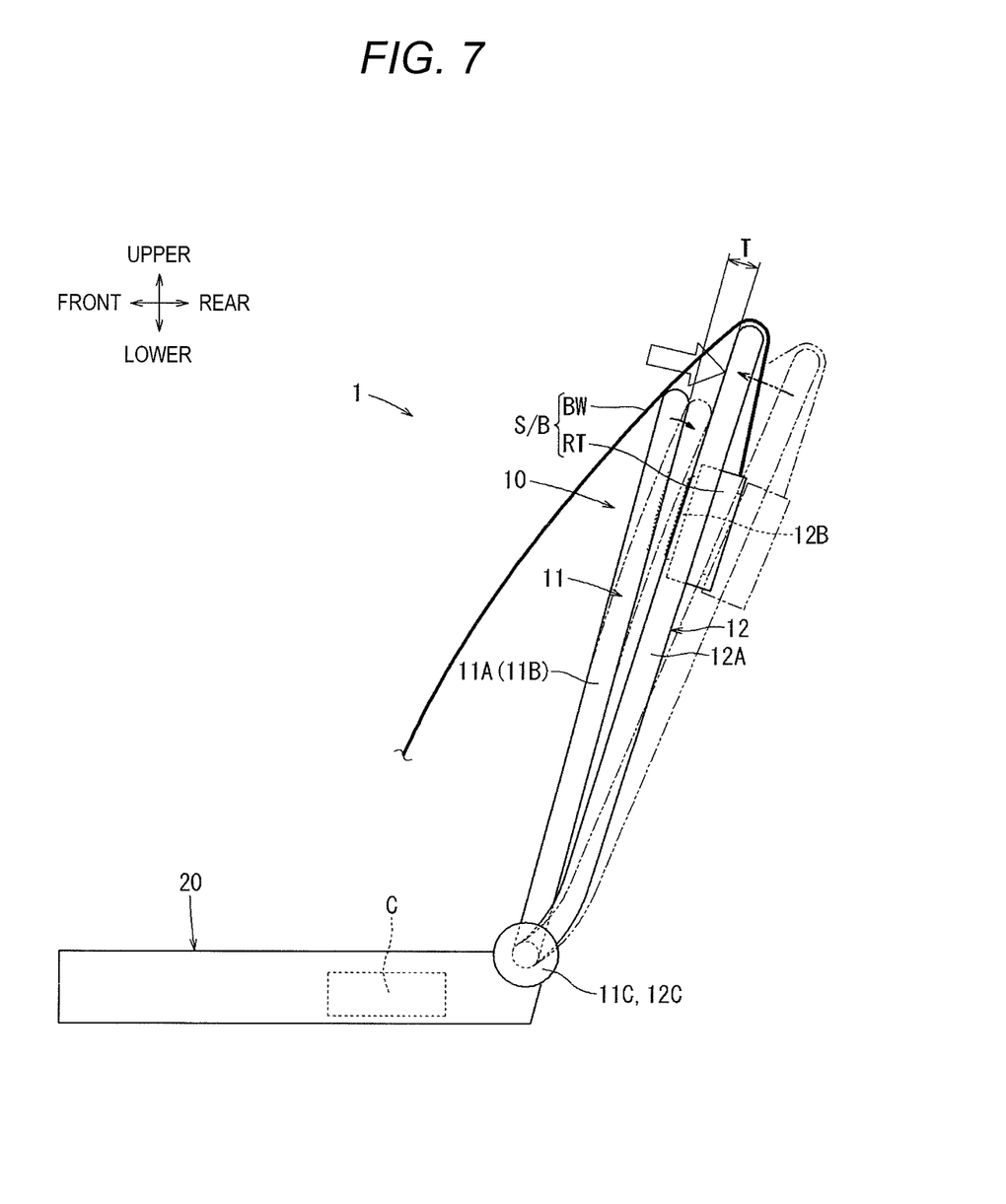
FIG. 7 is a side view showing a state in which the angle of the seat back is adjusted in accordance with the detection of a rear collision of a vehicle.
Figure 11:
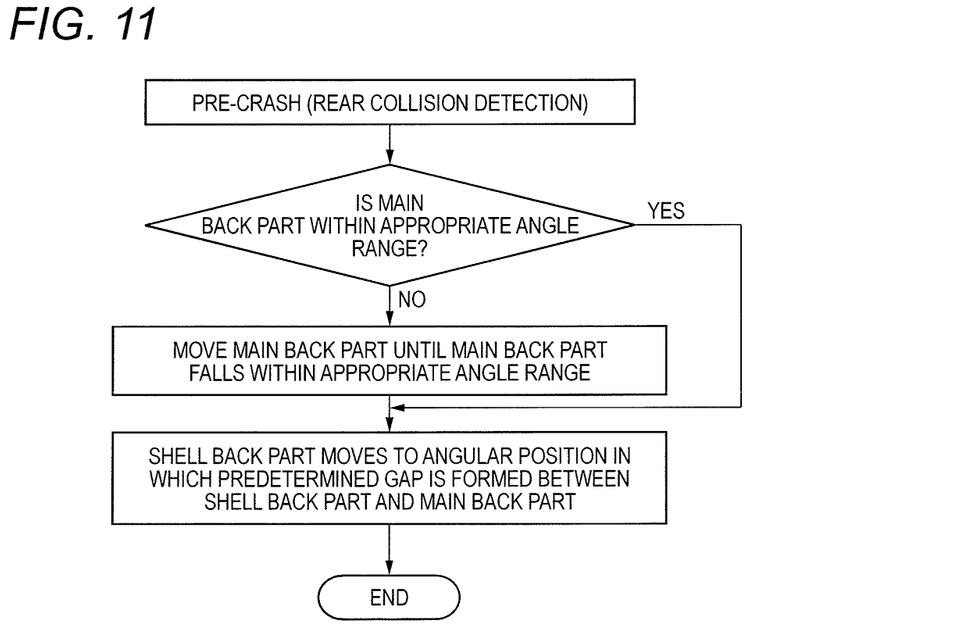
FIG. 11 is a flowchart showing a flow in which the angle of the seat back is adjusted in accordance with the detection of the rear collision of the vehicle.

On the other hand, when the collision detection is detection of the rear collision of the vehicle, as shown in FIG. 7, the controller C drives and controls the main back part 11 which receives the rearward load due to the occurrence of the rear collision, such that the shell back part 12 at the rear side is adjusted to a front load receiving inclination angle, in which the shell back part 12 is close to a state where there is a predetermined gap T between the rear side of the main back part 11 (see FIG. 11). Since this drive control has been performed, in a case where an excessive external load that presses and bends the shell back part 12 toward the rear side is applied to the main back part 11, the main back part 11 is pushed and bent until the predetermined gap T between the main back part 11 and the shell back part 12 is eliminated. In this way, the main back part 11 comes into contact with the shell back part 12 by absorbing the energy by the bending. As a result, it is possible to appropriately receive the external load in two stages by both parts.

In either case shown in FIGS. 6 and 7, as the meshing teeth 11B1, 12B1 (see FIG. 13) formed in the contact portions between each side frame 11B and the bridging plate 12B to be pressed against each other in the front and rear direction are meshed with each other, the main back part 11 and the shell back part 12 are strongly integrated with each other so as not to cause slippage therebetween in the height direction. In this way, the external load applied between the main back part 11 and the shell back part 12 can be firmly received in two stages.

Figure 8:
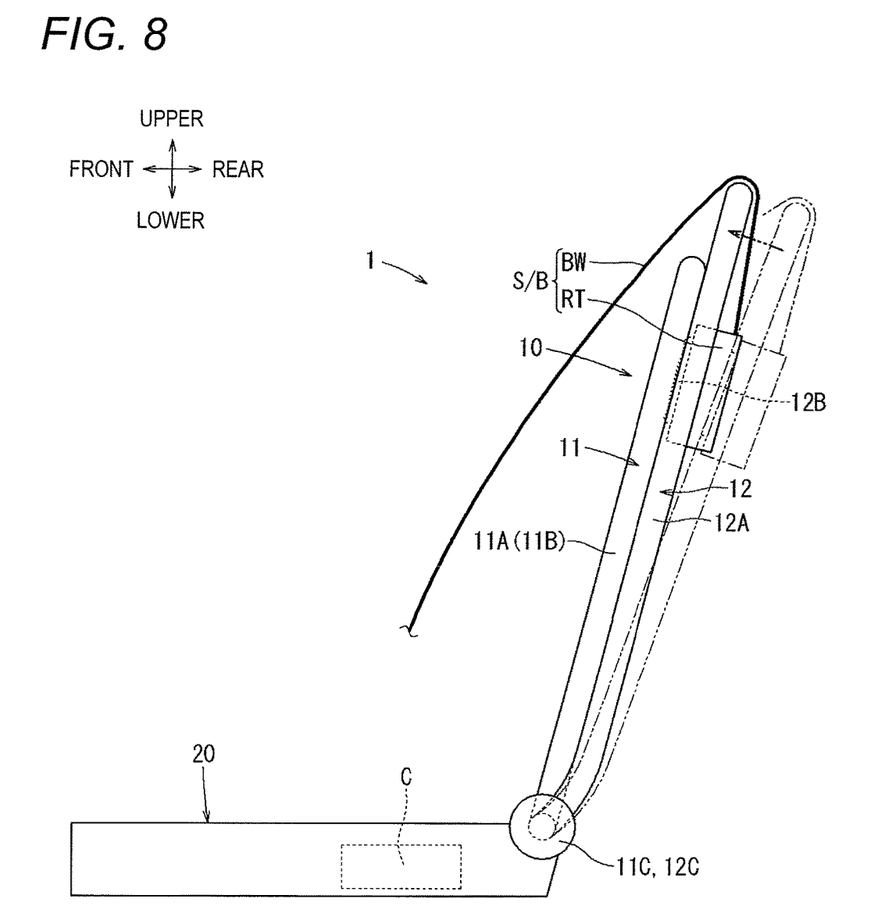
FIG. 8 is a side view showing a state in which the angle of the seat back is adjusted in accordance with the detection of a side collision of a vehicle.
Figure 12:
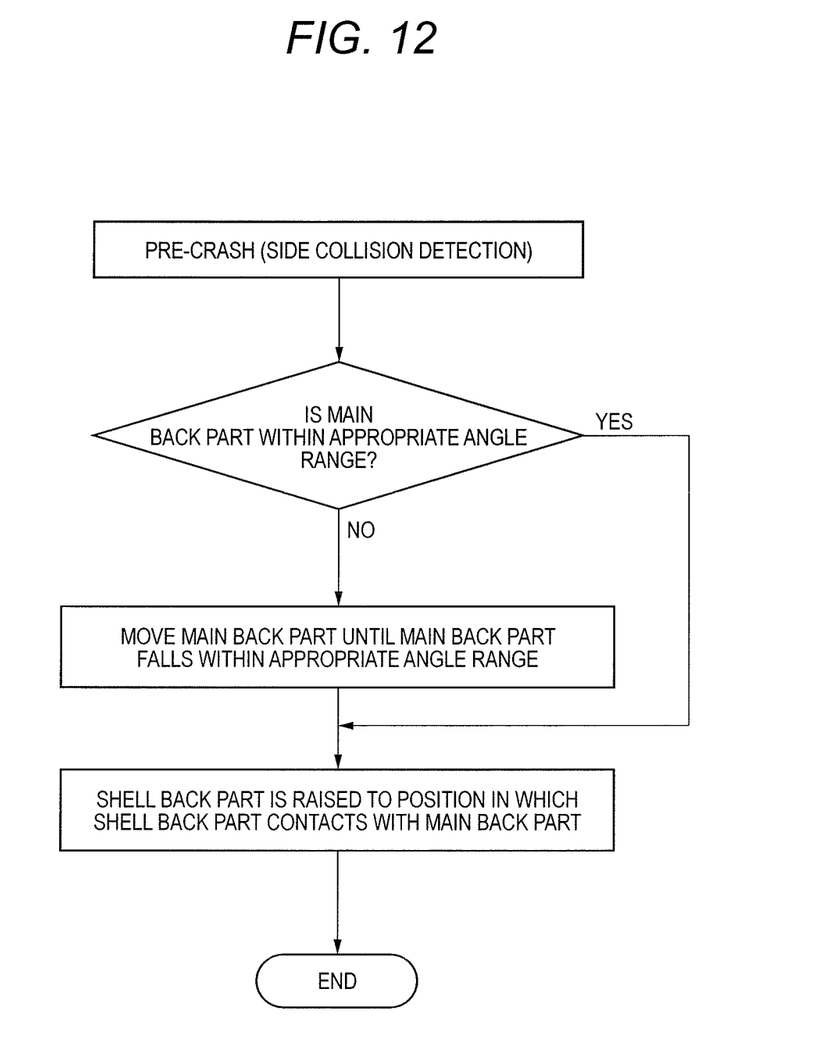
FIG. 12 is a flowchart showing a flow in which the angle of the seat back is adjusted in accordance with the detection of the side collision of the vehicle.

Further, when the collision detection is detection of the side collision of the vehicle, as shown in FIG. 8, the controller C drives and controls the shell back part 12 for protecting the body of the seated person from the lateral side due to the occurrence of the side collision such that the shell back part 12 is adjusted to an inclination angle for receiving the lateral load, in which the shell back part 12 comes into contact with the main back part 11 at the front side from the rear side (see FIG. 12). With this drive control, each side support portion 12S of the shell back part 12 protrudes forward from the both left and right sides of the main back part 11, as shown in FIG. 14. Therefore, the body of the seated person can be protected in a state of being appropriately wrapped by each side support portion 12S from both lateral sides.

In summary, the seat 1 of the present embodiment has the following configurations. That is, the vehicle seat (seat 1) includes: a seat back (seat back 10) that includes a top plate main part (main back part 11) configured to support a body of a seated person from the rear side; and a top plate side part (shell back part 12) configured to protrude more forward than the top plate main part (main back part 11) to support the body of the seated person from the lateral side; a side adjuster (shell back recliner 12C) configured to move the top plate side part (shell back part 12) between a protruding position (solid line position ill FIG. 14) in which the top plate side part (shell back part 12) protrudes more forward than the top plate main part (main back part 11) and a retracted position (imaginary line position in FIG. 14) in which the top plate side part (shell back part 12) is retracted from the protruding position (solid line position in FIG. 14); and a controller (controller C) configured to, in a case where a side collision of the vehicle is detected, drive and control the side adjuster (shell back recliner 12C) so that the top plate side part (shell back part 12) is in the protruding position (solid line position in FIG. 14).

In this way, even when the top plate side part (shell back part 12) configured to support the body of the seated person from the lateral side can be retracted from the protruding position (solid line position in FIG. 14) by the side adjuster (shell back recliner 12C), in a case where a side collision of the vehicle is detected, the top plate side part (shell back part 12) is in the protruding position (solid line position in FIG. 14) by the controller (controller C). Therefore, it is possible to appropriately protect the body of the seated person from the lateral side by the top plate side part (shell back part 12).

Further, in a case where the side collision of the vehicle is detected, when an inclination angle of the top plate main part (main back part 11) is out of a predetermined angle range (appropriate range Wp) suitable for receiving load, the controller (controller C) corrects an inclination angle of the top plate main part (main back part 11) so as to fall within a predetermined angle range (appropriate range Wp) suitable for receiving the load. In this way, even when the seat back (seat back 10) is in an angular posture that is not suitable for receiving load, such as when the seat back (seat back 10) is utilized in a relaxed posture where it is tilted, the top plate main part (main back part 11) is corrected to an inclination angle that falls within a predetermined angle range (appropriate range Wp) suitable for receiving the load in a case where the side collision of the vehicle is detected. Therefore, it is possible to appropriately protect the body of the seated person from the lateral side by the top plate side part (shell back part 12) protruding forward from the corrected position.

Further, the side adjuster (shell back recliner 12C) includes a reclining adjuster configured to support the top plate side part (shell back part 12) so that reclining thereof can be adjusted separately from reclining of the top plate main part (main back part 11) and adjust the top plate side part (shell back part 12) into an inclination angle in which the top plate side part is spaced rearward with respect to the top plate main part (main back part 11). In this way, since the top plate side part (shell back part 12) is spaced rearward with respect to the top plate main part (main back part 11) by the side adjuster (shell back recliner 12C), the seated person can take a relaxed posture in which his arms can be pulled rearward.

Further, the top plate side part (shell back part 12) includes a head side support portion (head side support portion 12S2) configured to support a head of the seated person from the lateral side, the head side support portion (head side support portion 12S2) being a portion of the top plate side part (shell back part 12) which protrudes most toward the front side. With this configuration, the body of the seated person, particularly, the head thereof can be effectively protected by being wrapped from the lateral side by the head side support portion (head side support portion 12S2) in a case where the side collision of the vehicle occurs.

Further, the top plate side part (shell back part 12) has a shape including a curved concave surface (curved concave surface 12S1) which protrudes in a shape curved toward the front side so as to wrap the body of the seated person from the lateral side in a recessed shape. With this configuration, the body of the seated person can be more appropriately protected by being wrapped from the lateral side by the top plate side part (shell back part 12) having the curved concave surface (curved concave surface 12S1) in a case where the side collision of the vehicle occurs.

Although the embodiments of the disclosure have been described above using one embodiment, the disclosure can be implemented in various forms other than the above embodiment. For example, the configuration according to the vehicle seat of the disclosure can applied to a seat of an automobile other than a left seat, and can also be widely applied to a seat of a vehicle other than an automobile, such as a train, an aircraft, and a ship.

Further, the side adjuster may be configured to connect the top plate side part of the seat back to the top plate main part, thereby moving the top plate side part so as to change its protruding position with respect to the top plate main part. Further, the side adjuster may be configured to move the top plate side part separately on the right side and the left side. Further, it is only necessary that the protruding position of the top plate side part is a position in which the top plate side part protrudes more forward than the top plate main part. Further, the top plate side part of the seat back may protrude only from either the left or right side of the top plate main part. Further, in a case where the top plate side parts protrude from both the left and right sides of the top plate main part, both top plate side parts may be moved by the side adjuster such that different movement can be made on the left side and the right side.

Further, in the case where the side collision of the vehicle is detected, the protruding position to which the top plate side part is moved need not necessarily be the maximum protruding position within the movable range of the top plate side part, and it is only necessary that the top plate side part protrudes more forward than the top plate main part when the top plate side part is in the protruding position. In other words, the protruding position need not necessarily be the maximum movement position within the movable range where the top plate side part is locked by being in contact with the top plate main part from the rear side. Further, the retracted position of the top plate side part need not necessarily be a position retracted from the top plate main part, and it is only necessary that the retracted position is a position retracted from the protruding position.

What is claimed is:

1. A vehicle seat comprising:
a seat back including:
a top plate main part having a front-facing seating surface; and
a top plate side part configured to protrude more forward than the top plate main part from an outer side of the top plate main part;
a side adjuster configured to move the top plate side part between a protruding position in which the top plate side part protrudes more forward than the top plate main part and a retracted position in which the top plate side part is retracted from the protruding position; and
a controller configured to, in a case where a side collision of a vehicle is detected, drive and control the side adjuster so that the top plate side part is in the protruding position,
wherein the top plate side part has a shape including a curved concave surface which protrudes in a shape curved toward the front side so as to wrap the top plate main part from a backside of the top plate main part to both sides of the outer side of the top plate main part in a recessed shape.

2. The vehicle seat according to claim 1,
wherein, in the case where the side collision of the vehicle is detected, when an inclination angle of the top plate main part is out of a predetermined angle range suitable for receiving load, the controller corrects the inclination angle of the top plate main part so as to fall within the predetermined angle range suitable for receiving the load.

3. The vehicle seat according to claim 1,
wherein the side adjuster includes a reclining adjuster configured to support the top plate side part so that reclining thereof can be adjusted separately from reclining of the top plate main part and adjust the top plate side part into an inclination angle in which the top plate side part is spaced rearward with respect to the top plate main part.

4. The vehicle seat according to claim 1,
wherein the top plate side part includes a head side support portion, the head side support portion being an upper portion of the top plate side part and being a portion of the top plate side part which protrudes most toward the front side.

5. The vehicle seat according to claim 1,
wherein the retracted position is a position in which the top plate side part is retracted from the top plate main part.

6. The vehicle seat according to claim 1,
wherein the controller receives a signal from a sensor, and detects the side collision of the vehicle based on the signal from the sensor.

7. The vehicle seat according to claim 1,
wherein, in the case where the side collision of the vehicle is detected, when an inclination angle of the top plate main part is out of a predetermined angle range suitable for receiving a load, the controller corrects the inclination angle of the top plate main part so as to fall within the predetermined angle range suitable for receiving the load by tilting the top plate main part forward.

* * * * *